United States Patent
Omer (10) Patent No.: US 7,441,441 B2
(45) Date of Patent: Oct. 28, 2008

(54) AUTOMATIC LEAK DETECTION AND ISOLATION SYSTEM FOR A PIPELINE

(76) Inventor: Bndean Abdulkadir Omer, 206 Holdenhurst Road, Bournemouth (SE) BH8 8AT (*) Notice: Subject to any disclaimer, the term of this patent is extended or adjusted under 35 U.S.C. 154(b) by 0 days.

(21) Appl. No.: 11/335,325

(22) Filed: Jan. 19, 2006

(65) Prior Publication Data

US 2006/0162429 A1    Jul. 27, 2006

(30) Foreign Application Priority Data

Jan. 21, 2005  (GB) ................. 0501429.5
Oct. 25, 2005  (GB) ................. 0522247.6

(51) Int. Cl.
*G01M 3/28* (2006.01)
(52) U.S. Cl. ............................. 73/40.5 R
(58) Field of Classification Search .............. 73/40, 73/40.5 R, 49.1, 49.5, 49.6; 138/104
See application file for complete search history.

(56) References Cited

U.S. PATENT DOCUMENTS

| 3,762,446 | A | | 10/1973 | Tungseth et al. |
| 4,074,692 | A | * | 2/1978 | Shafer .................. 137/488 |
| 5,072,622 | A | * | 12/1991 | Roach et al. ............ 73/40.5 R |
| 5,419,183 | A | | 5/1995 | Keys et al. |
| 5,927,762 | A | | 7/1999 | Webb et al. |
| 6,032,699 | A | * | 3/2000 | Cochran et al. ............ 138/104 |
| 6,123,110 | A | | 9/2000 | Smith et al. |
| 6,171,025 | B1 | * | 1/2001 | Langner et al. .......... 405/154.1 |
| 6,339,953 | B1 | | 1/2002 | Ashworth |
| 6,467,336 | B1 | | 10/2002 | Gotowik |
| 2003/0037596 | A1 | | 2/2003 | Sorensen |
| 2003/0116214 | A1 | | 6/2003 | Meli et al. |
| 2004/0035464 | A1 | | 2/2004 | Folkers |
| 2004/0154380 | A1 | | 8/2004 | Walker |

FOREIGN PATENT DOCUMENTS

| BE | 869332 A1 | | 11/1978 |
| CH | 455413 | | 7/1968 |
| DE | 2227212 A1 | | 12/1973 |
| DE | 3700035 A1 | | 7/1988 |
| EP | 0606166 | | 7/1994 |
| GB | 2005036 A | * | 4/1979 |
| GB | 2327759 | | 2/1999 |

OTHER PUBLICATIONS

Patent Office Search Report, Application No. GB0522247.6, dated Dec. 15, 2005.
Patent Office Search Report, Application No. GB0522247.6, dated Dec. 16, 2005.

* cited by examiner

*Primary Examiner*—Hezron Williams
*Assistant Examiner*—John Fitzgerald
(74) *Attorney, Agent, or Firm*—Beem Patent Law Firm (57) ABSTRACT

An automatic leak detection and isolation system for a fluid pipeline (3) comprising a pipeline section (1) through which the fluid flows, the pile line section comprising an inner section (5) through which the fluid flows and a sleeve (9) coaxial with and surrounding the inner section (5) and filled with a hydraulic fluid under pressure. A sensing device (not shown in this figure) is provided for sensing a reduction of the pressure of the hydraulic fluid indicating a leakage from or within the pipeline (3), and closure means (11) are provided, actuable in response to the sensing device sensing a reduction in pressure of the hydraulic fluid to close off one end of the pipeline section (1).

20 Claims, 7 Drawing Sheets

AUTOMATIC LEAK DETECTION AND ISOLATION SYSTEM FOR A PIPELINE

FIELD OF THE INVENTION

This invention relates to an automatic leak detection and isolation system for a pipeline.

BACKGROUND OF THE INVENTION

Pipelines are used for carrying a number of materials, particularly liquids, such as crude petroleum and gases. Often, these pipelines are very extensive, some times ranging over distances of hundreds of miles and long stretches of these pipelines are located a long way from habitations, rendering them not readily accessible if repairs should be needed. If there is a leak in the pipeline, this can usually only be discovered if there is a change of the delivery flow at the receiving end of the pipe, where a liquid is concerned or a drop in pressure at the receiving end of the pipe if a gas is concerned. By the time there is a noticeable change in these parameters, the leak may well have been in existence for a considerable time and, if the leak is relatively small, not until the next time the pipeline is due for a routine check. Thus, considerable amounts of fluid may have escaped with a possible deleterious effect on the local ecology.

One the presence of a leak has been determined, it is necessary to determine where the leak has occurred so that the necessary repairs to the pipeline can be made. In the meantime, the pipeline must be shut down to avoid further leakage. Discovering the location of the leakage, particularly where the pipeline extends for hundreds of miles, can be tedious and labour intensive as a complete inspection of the pipeline has to be undertaken up to the point at which the leak is found. This is made worse in the case that the pipe is carrying a gas since, unless the leak is large, such as a visible hole in the pipe, then there may be no visible signs of the leak and the pipe may need to be pressurised to enable the leak to be detected.

The present invention seeks to overcome some or all of these difficulties by providing an automatic leak detection system which can be made sufficiently sensitive as to detect even the smallest of leaks, will be able to pinpoint the pipe section in which the leak has occurred and can be made to shut off the section of the pipe in which the leak is present.

SUMMARY OF THE INVENTION

According to the invention, an automatic leak detection and isolation system for a fluid pipeline comprisies a pipeline section through which the fluid flows, the pile line section comprising an inner section through which the fluid flows and a sleeve coaxial with and surrounding the inner section and filled with a hydraulic fluid under pressure, a sensing device for sensing a reduction of the pressure of the hydraulic fluid indicating a leakage from or within the pipeline, and closure means, actuable in response to the sensing device sensing a reduction in pressure of the hydraulic fluid to close off one end of the pipeline section.

Preferably, a second closure means is provided for closing off the other end of the pipeline section, both closure means suitably having their own sensor.

The pipeline may be built of a plurality of pipeline sections connected together by a housing in Which the closure means for the adjacent pipeline section ends are located.

The or each closure means may comprise a flap valve pivoted at its upper extremity and movable between a first or open position in which it lies substantially parallel to the pipe section and a second or closed position in which it lies substantially perpendicular to the pipe section and seats over the end of the inner section so as to close it.

The flap may be formed of three hinged sections comprising a middle section, in which, in the open position, lies parallel to the pipe section and two outer sections, one on each side of the middle section, which fold inwards to a degree necessary to enable the flap, in its open position, to lie within the housing.

The flap may be retained in its open position by a plurality of movable rods extending through the end of the sleeve such that withdrawal of the rods into the sleeve will permit the flap to drop under gravity and to seal against the end of the inner section of the pipe section under both the action of gravity and the pressure in the pipeline.

The rods may be attached to an at least part-annular piston, forming, in combination with the rods, an hydraulic pressure sensor, which is a located in the sleeve and pushed up against the inner end of the sleeve by the force of the hydraulic pressure.

The ends of the rods located in the housing may be acted upon by the pressure in the pipeline such that, in the absence of hydraulic pressure in the sleeve will force the rods to withdraw into the sleeve, at the same time moving the piston away from inner end wall of the sleeve.

The flap valve may be provided with contacts which indicate whether the flap valve is opened or closed.

Holding means may be provided to hold the at least part-annular piston against the end of the sleeve when the hydraulic pressure is present in the sleeve.

The holding means may comprise a holding member connected to the piston of an holding piston and cylinder, the piston being acted on by the hydraulic pressure in the sleeve in a direction to push the holding member against the at least part-annular piston to hold it in position at he end of the sleeve.

The system may further comprise a ball valve for detecting the fullness of the sleeve with hydraulic fluid, the ball mechanism of the ball valve having a projection engageable with teeth on the piston rod of the piston of the holding piston and cylinder when the sleeve is full of hydraulic fluid to prevent movement of the piston in a direction to disengage the holding member from the at least part-annular piston.

The system may also be provided with an hydraulic control valve which controls admission of hydraulic fluid to the sleeve and acts as a sensor for the hydraulic fluid in the sleeve to provide indications as to the state of the hydraulic pressure.

The hydraulic control valve may have a valve seat which is connected to an hydraulic fluid line and a conical valve member which is spring urged against the seat, the rear of the valve member being open to the hydraulic pressure in the sleeve.

The spring may be dimensioned such that when the hydraulic pressure at the valve seat is substantially the same as the hydraulic pressure in the sleeve, the force of the spring will push the valve member against the seat to close the valve but when the hydraulic pressure in the sleeve is reduced, the pressure of the hydraulic fluid at the seat will be sufficient to push the valve member away from the seat to open the valve against the pressure of the spring.

The hydraulic control valve may be provided with two pairs of contacts, one of which closes when the valve is closed and the other of which closes when the valve is open.

The feed to the valve seat may be: controlled by an electrically operated valve.

The sleeve is provide with an air bleed valve.

Means may be provided for transmitting data about the pipe section to a central control station from various contacts associated with the operating parts of the pipeline section.

BRIEF DESCRIPTION OF THE DRAWINGS

The invention will now be described in further detail, by way of example, with reference to the drawings, in which.

DESCRIPTION OF THE PREFERRED EMBODIMENTS

In considering the embodiment of the invention described here, it must be appreciated that, for ease of description, very short sections of pipeline are used. In practice, any suitable lengths of pipe section may be used, the normal range being between five and fifty metres.

Figure 1:
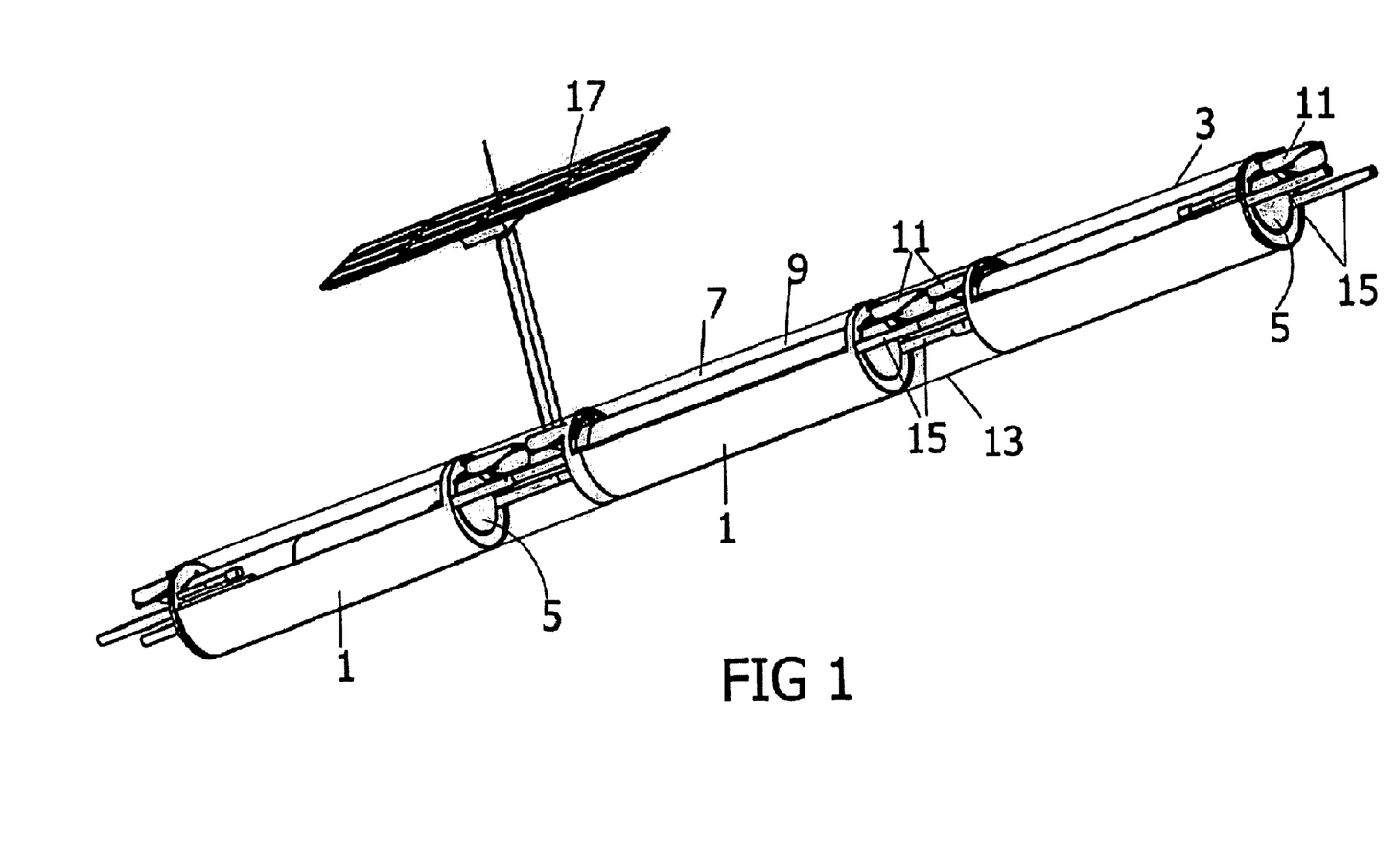
FIG. 1 is perspective view partially cut away, of two sections of the pipeline and a part of a third.

Referring firstly to FIG. 1, there are shown a number of sections 1 of a pipeline 3. Each pipeline section 1 comprises a pair of concentric pipe sections 5 and 7. The inner pipe section 5 carries the fluid to be transported while outer pipe section 7, which surrounds the inner pipe section 5 to provide a coaxial sleeve 9 and carries an hydraulic fluid. At each end of each section of the pipe, the sleeve 9 is permanently closed by an end wall, while a specially constructed shut off valve 11 whose construction will be described hereafter, can be used to isolate the pipeline section 1 of the pipeline from the other pipeline sections 1 as required. These shut off valves are controlled by sensing means, to be described hereafter, which determine the state of the hydraulic fluid in the sleeve 9. Two adjacent pipeline sections 1 of the pipeline 3 are connected together by a cylindrical housing 13 which is of generally the same diameter as the outer section 7, is open to the fluid flowing in the inner pipe section 5 and contains the mechanism of the two adjacent shut off valves 11, one for each of two adjacent pipeline sections 1. Also provided in the system is an hydraulic control valve 14 (FIG. 3) which controls the admission of hydraulic fluid into the sleeve 9 and is provided with a set of contacts, to be described hereafter, which provide information as to the state of the control valve and thus the state of the hydraulic fluid in the sleeve 9.

Additionally a holding means 41 (FIG. 3), is provided to maintain the shut off valve 11 in the open position when the sleeve is full of hydraulic fluid.

Carried in the sleeve 9 and passing through the housing 13 between the pipe sections 1 are three piping and wiring conduits 15a to c whose purpose will be explained later. Basically, these are located in the lower half of the sleeve 9.

Also provided, at least with every few sections, is a solar panel 17 (shown here connected to the housing 13 between the left and middle pipeline sections 1) which acts to charge, an accumulator providing current for various reporting functions within the sections 1 and also contains a transmitting aerial enabling reports to be sent, suitably by way of a satellite, to the control station of the pipeline.

Figure 2:
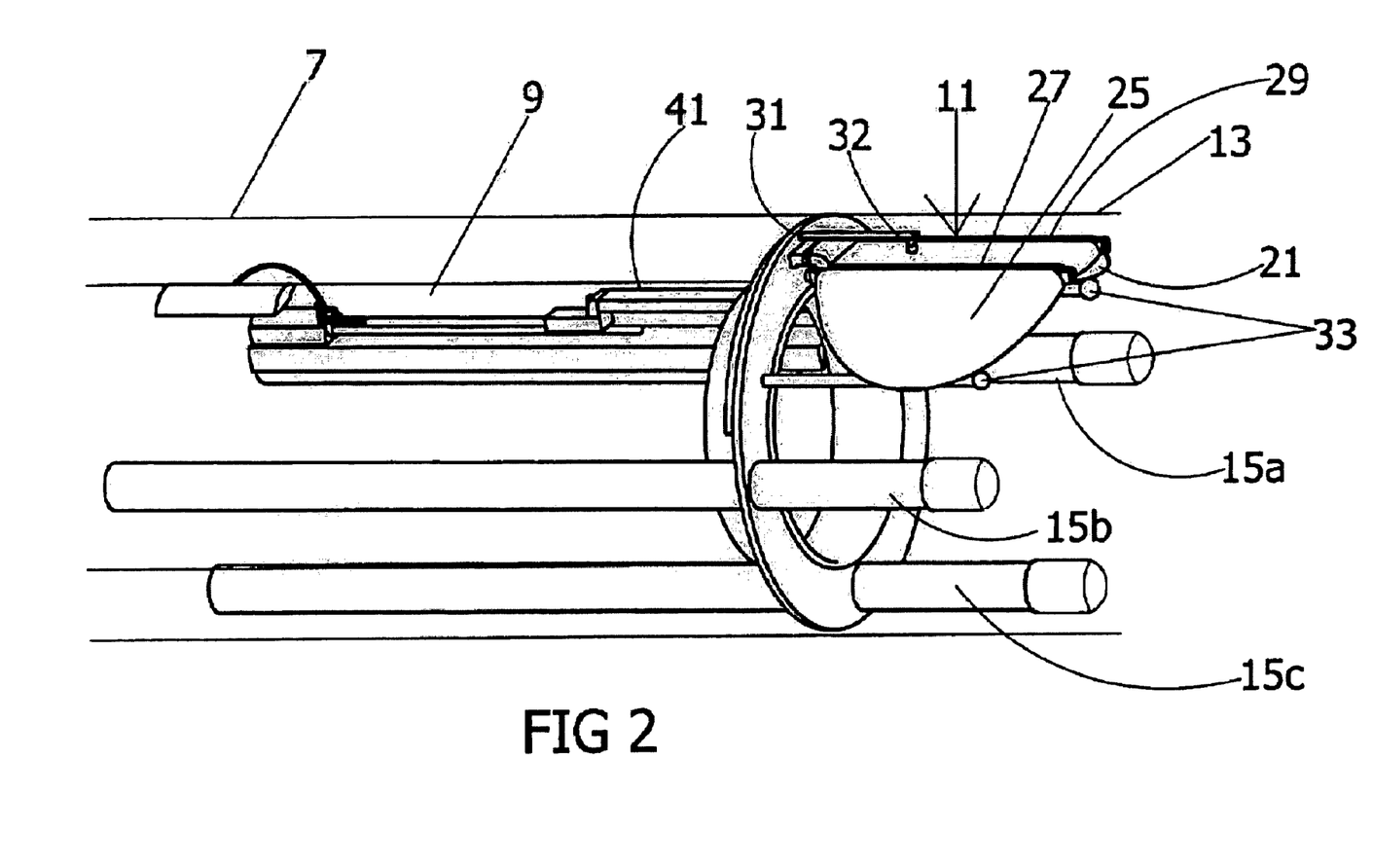
FIG. 2 is a perspective view of a pipe section 1 with the outer covering of the outer pipe sections being rendered transparent.
Figure 3:
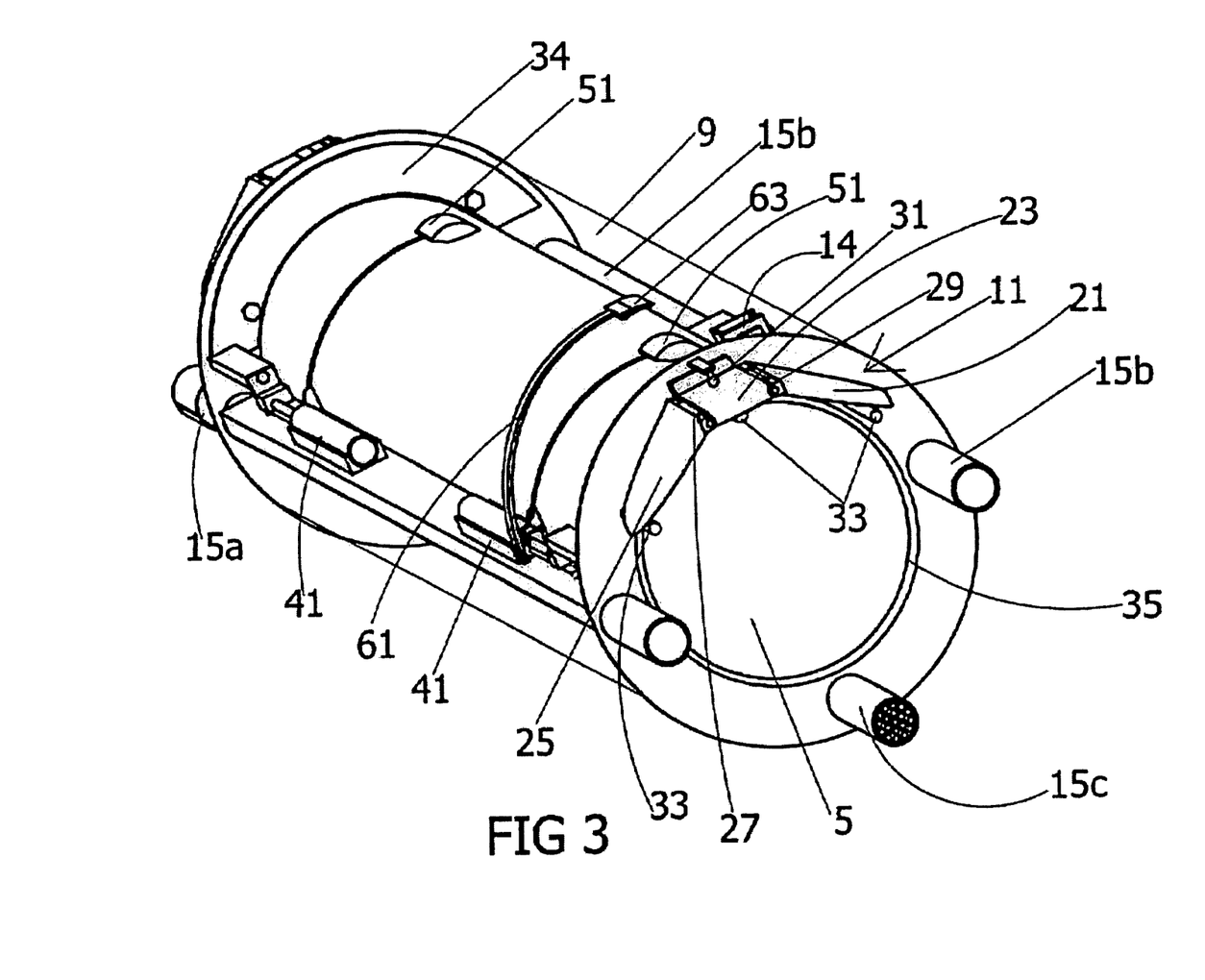
FIG. 3 is a perspective view of one section of the pipeline with the upper part of the outer concentric pipe section being rendered transparent.

FIGS. 2 and 3 show the construction of the shut off valve 11. This valve 11 comprises an overall circular shape which is divided into three sections 21, 23 and 25 which are hinged together at 27 and 29 so that in the open position shown they take up a generally curved shape to enable them to fit within the, confines of the cylindrical housing 13, The valve 11 as a whole is hinged to the inner pipe section 5 by a bracket 31. Three rods 33, when in the extended position shown, hold the valve 11 in the open position shown. On retraction of the rods 33 (to the left in FIG. 2), the valve 11 will drop under its own weight with the sections 21 and 25 unfolding to provide a circular valve member which seals itself against the opening 35 in the inner section 5 and is held in place by the pressure present in the pipeline. The three rods 33 are connected to a part-annular piston 34 movable longitudinally in the sleeve 9 and operable to retract the rods 33. A switch 32 is provided to indicate whether the valve 11 is open or shut.

The annular piston 34 is held in position by holding means 41 (see particularly FIGS. 3 and 4) which is seated on one (15a) of the piping and wiring conduits 15 which provides an air connection of the pipeline 3. It comprises a piston and cylinder arrangement of which the exterior of the cylinder is shown at 43 while the piston rod of the piston is shown at 45. The piston rod 45 has at its free end a push element 47 which is adapted to engage the annular piston 34 when in its extended position.

Figure 4:
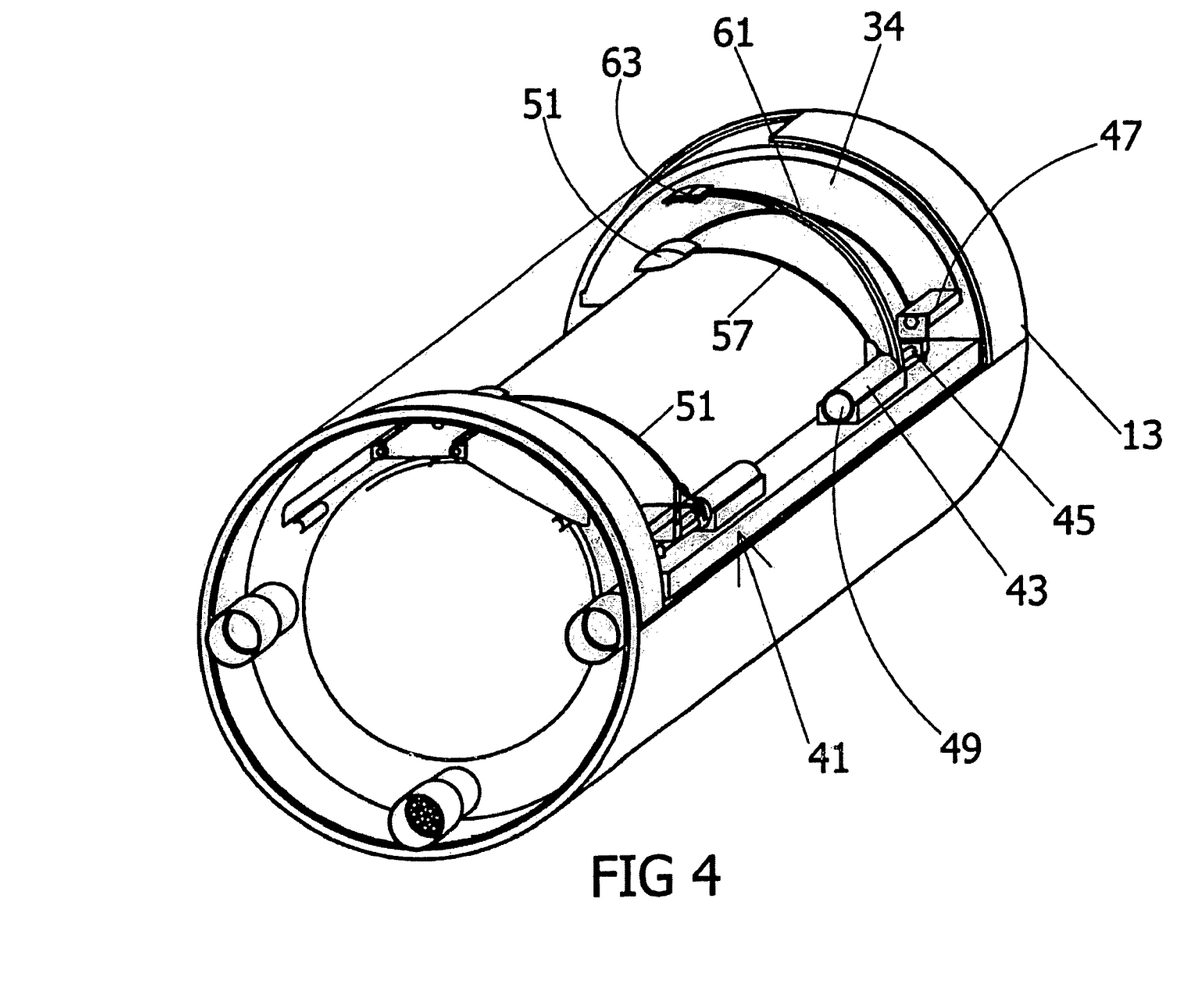
FIG. 4 is a perspective view of the section of the pipeline similar to FIG. 3 but from a different angle

The end 49 of the cylinder 43 is open to the hydraulic fluid in the sleeve 9 while the interior of the cylinder 43, on the other side of the piston is open to atmospheric air pressure through the conduit 15a. A spring (not shown) is provided to bias the piston to its retracted position in which it permits movement of the annular piston 23 away from the end wall of the sleeve to withdraw the rods 33 and allow the flap valve 11 to close. Suitably, the holding means is associated with switch means (not shown) which provide an indication of the position of the piston rod 45 to a remote station.

Figure 5:
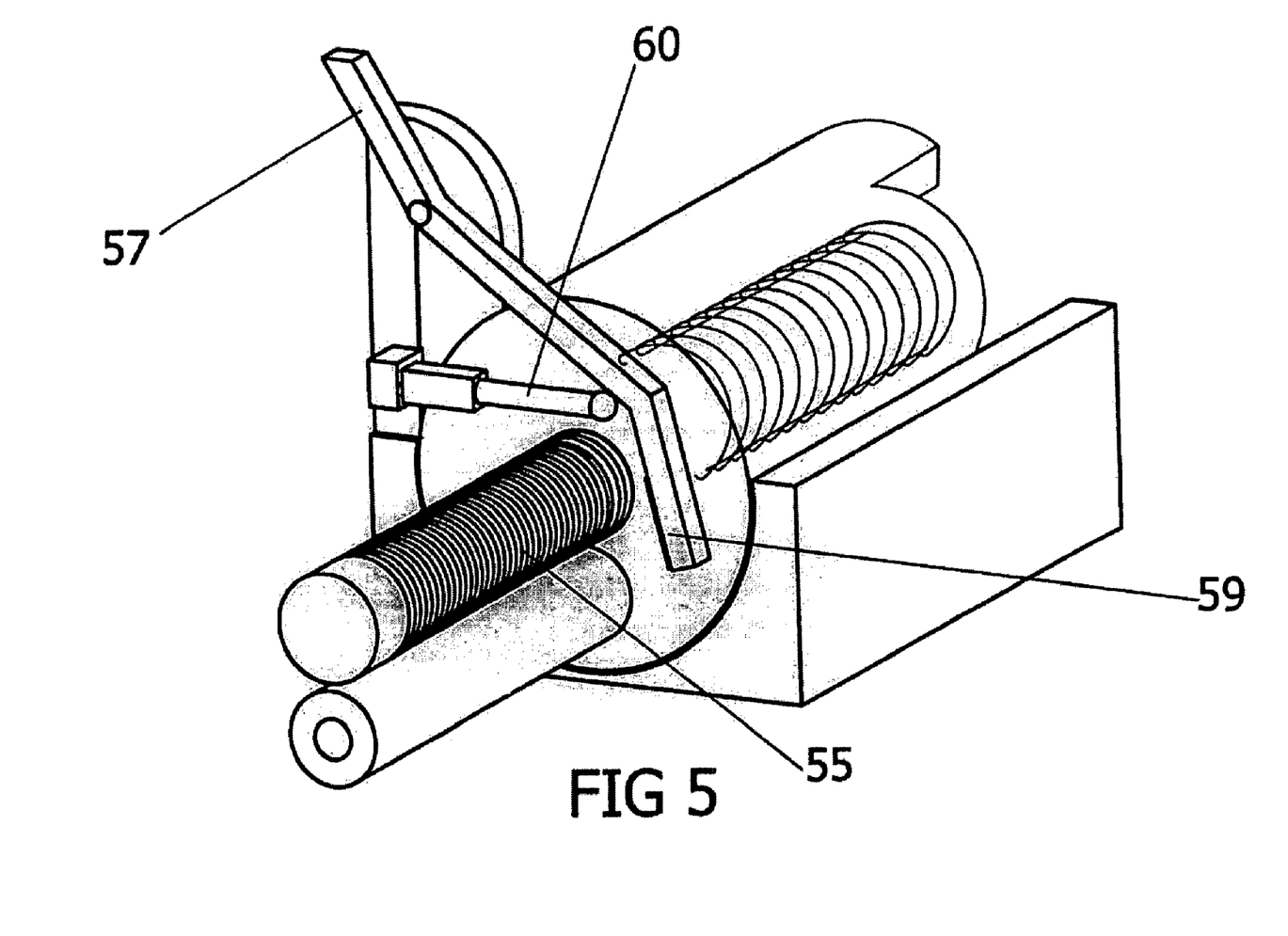
FIG. 5 is a perspective fragmentary view of part of the holding means showing the interaction of the holding means with a float valve

Associated with the holding means 41, and in particular with the piston rod 43 is a float 51, carried on a pivoted rod 57, which senses the level of hydraulic fluid in the sleeve 9. It is pivoted to the housing of the cylinder 43 at 53 as is shown in more detail in the fragmentary view shown in FIG. 5. As can be seen from FIG. 5, the piston rod 45 is provided with teeth 55 which cooperate with a blade element 59 provided on the rod 57 of the float 51 such that the blade element 59 will engage between the teeth 55 when the float 51 is at its upper level, indicating a full sleeve 9 of hydraulic fluid and prevent retraction of the piston rod 45. Suitably the teeth 55 are slanted on one side permitting a ratchet action, allowing the piston rod 45 to extend but not retract. A sensor switch 60 is also provided to indicate to the remote control station the state of the float 51 and the engagement or otherwise of the blade 59 with the teeth 55

Figure 6:
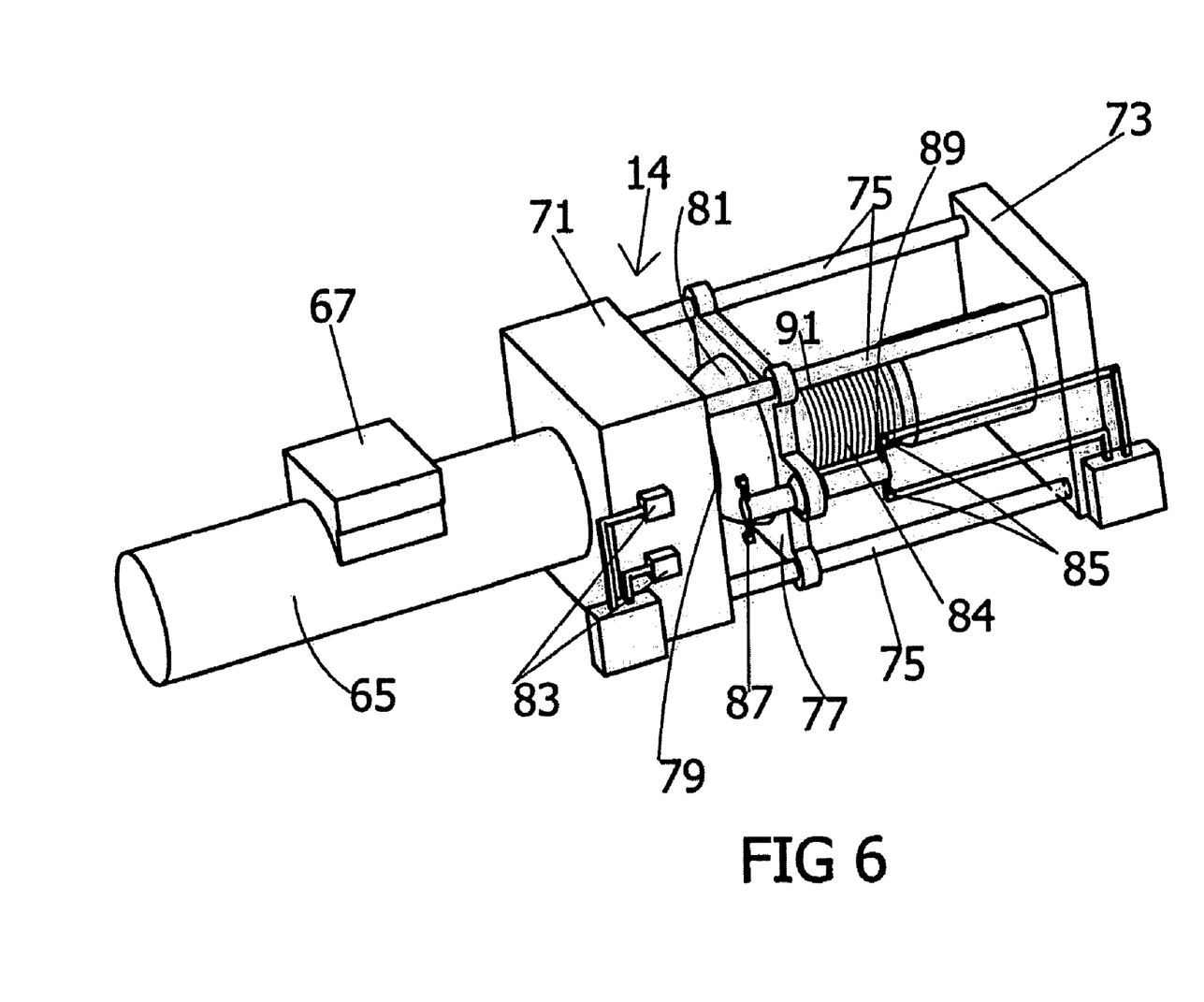
FIG. 6 is a perspective view of an hydraulic control valve.

As can be seen, each pipeline section 1 has a valve, 11 and holding means at each end. Additionally, one of the floats 51 cooperates with an air bleed line 61 which is used to bleed off air in the sleeve 9 while the sleeve 9 is being filled with hydraulic fluid. This bleed line 61 is provided with a bleed outlet opening arrangement 63. This outlet arrangement 63 cooperates with the float 51 so as to shut the outlet when the float is in its upper position FIG. 6 shows the hydraulic control valve 14 which, in use, sits on the conduit 15b which constitutes the hydraulic supply line of the pipeline. It is connected to the conduit 15b by an inlet pipe, 65 which is controlled by an electric or electromagnetic valve 67. The valve 14 basically comprises a pair of end members 71 and 73 connected together by four rods 75 carrying a movable carriage 77. The end member 71 has a, passage for the hydraulic fluid, which passage terminates in a raised valve seat 79.

The carriage 77 carries a conical or semi-spherical valve member 81 which cooperates with the valve seat 79 to shut off the interior of the sleeve 9 from the hydraulic fluid inlet pipe 65. The valve member is open to the sleeve on all sides except when closed when it is open on one side substantially only to the hydraulic fluid in the inlet pipe 65. The valve member 81 is urged towards the valve seat 77 by a spring 83 which is of a strength such that, with pressurized hydraulic fluid is acting within the sleeve 9, the valve member 81 will be seated on the valve seat 79 against the pressure of the hydraulic fluid in the inlet pipe 65.

The hydraulic control valve 14 has two pairs of contacts 83 and 85 which cooperate with a pair of movable make and break elements 87 and 89 carried by a rod 91 which moves with the carriage 77 so as to provide an indication, by making the appropriate pair of contacts 83 or 85 when it is at either end of the travel of the valve member 81. Thus, in the position shown in FIG. 6, the valve is open and the contacts 85 are made while when the valve is closed, the contacts 83 will be made.

It is also to be understood that, where the casing 13 itself needs to be protected from leaks, an thin annular extension of the sleeve 9 could be positioned around the inside of the casing in direct communication with the main sleeve 9.

As has been previously mentioned, the signals provided by the various switching devices are transmitted to a remote, control station either through wiring through the wiring conduit 15c or by wireless transmission through the solar cell and aerial structure 17

The operation of the system will now be described:

1. Set up.

Once the sections 1 of the pipeline 3 have been connected up, it is necessary for the operation of the system that the sleeve be filled with pressurised hydraulic fluid. In this situation, the flap valves 11 will be shut, the piston 45 of the holding device 41 will be retracted with the annular valve 34 away from end wall of the sleeve 9. The hydraulic control valve 14 will be closed and the electrical shut off valve 67 will be closed. Indications will be provided at the remote control station of this situation.

First of all the shut off valve 67 will be opened by remote control to allow pressurised hydraulic fluid to pass through the end plate 71 of the hydraulic control valve so as to act on the valve member 81. The pressure of the hydraulic fluid on the valve member 81 will overcome the pressure of the spring 91, there being no pressure inside the sleeve 9 and the valve 14 will open to allow the hydraulic fluid to enter the sleeve 9. At this moment, the contacts 83 will break followed shortly thereafter by the contacts 85 being made. This will indicate to the remote station that the valve 14 has opened.

The hydraulic fluid will start to fill the sleeve 9 and will cause the floats 51 to begin to rise. Air will be forced out of the sleeve 9 through the air bleed line 61 and the air outlet arrangement 63.

Once the hydraulic fluid has filled the sleeve 9, the float 51 will have floated upwardly until it closes off the air outlet arrangement to seal the sleeve 9. It will also have engaged its blade element 59 with the teeth 55 on the piston rod 45 preventing any retraction of the piston rod 45.

Once the sleeve is filled, the pressure in the sleeve will built up with a number of effects. Firstly, it will act on the annular piston 34 and force it against the end wall of the sleeve 9 causing the rods 33 to extend and push the flap valve 11 up to its partially folded and open position, opening the associated section 1 of the pipeline 3. Secondly, the piston of the holding device 41 will be subjected on one side to the hydraulic pressure in the sleeve 9 and on the other side to the ambient air through the conduit 15a and will therefore move to extend the piston rod 45 and thus the pusher element 47 against the, annular piston 34 to hold it in place. It will be able to do this because of the ratchet system provided by the blade 59 and the teeth 55. Thirdly, the pressure in the sleeve 9 together with the force of the spring 91 of the hydraulic control valve 14 will overcome the pressure in the hydraulic fluid supply to close the valve 14. The contacts 83 will make and the contacts 85 will break.

2. Leak Operation

There are basically three types of leak which can occur in a pipeline section as described above. These are:

a) leakage of hydraulic fluid from the sleeve to the outside.

b) leakage of hydraulic fluid from the sleeve into the inner pipe line and c) leakage of both the hydraulic fluid and the fluid in the pipeline to the outside.

In all of these situations, the hydraulic sleeve is breached which will cause shut off of the pipe section.

The operation is as follows:

a) When hydraulic fluid leaks out of the sleeve 9, the hydraulic pressure will drop. This results in three things. Firstly the valve 14 will open if the valve 67 is also open since the pressure in the inlet pipe 657 will overcome the combination of residual pressure of the hydraulic fluid in the sleeve and the force of the spring 91 and try to restore the pressure in the sleeve 9. If the leak is very small, this top up operation will be successful but the valve 14 will open and close spasmodically, operating the contacts 83 and 85 sending a message of a small leak to the remote control centre. In these circumstances, no immediate action is necessary and the pipeline 3 remains open.

However, with a large leak, the reduction in pressure of the hydraulic fluid will be sufficiently fast that the valve 14 will remain open and the contacts 83 will remain open and the contacts 85 will remain closed, indicating to the remote control station that there is a serious leak present. In these circumstances, the valve 67 should be closed to avoid excessive loss of hydraulic fluid from the system and this can be carried out manually at the remote control station or automatically, for example, using a short delay timer.

The second thing that happens is that the level of hydraulic fluid drops and this is indicated by the float 51. When the level of the fluid has dropped sufficiently, the blade 59 will retract from the teeth 55 of the holding device 41 and the spring in the holding device will cause the piston rod 45 to retract allowing movement of the annular piston 34.

The third thing that happens is that the annular piston 34 has no pressure from the interior of the sleeve 9 but the pressure of the fluid in the pipeline is acting on the ends of the rods 33 to push the annular piston 34 back into the sleeve 9 and, in so doing, the rods 33 will retract with it. This in turn releases the flap valve 11 to fall under gravity, also allowing its parts to fold out to provide aa full circular disk. The force of the fluid inner section 5 of the pipeline section will force the flap valve against the open end of thee inner section 5 and close it thus effectively shutting off the section. It will be appreciated that the action of the flap valve is taking place at both ends of the pipeline section 1 so that the pipeline section 1 is effectively cut off from the rest of the pipeline. The various switches provided will indicate to the remote control station that hydraulic fluid has leaked out of the sleeve 9, that the blade 59 has disengaged from the teeth 55 of the piston rod 45 and that the flap valve 11 has closed. They will also indicate which section 1 is involved so that repair teams can be speedily dispatched to the correct site. Once repairs have been made, the set up procedure can be initiated (as set out above the two flap valves 11 at the ends of the pipeline section will open and the section will rejoin the pipeline.

b) In this case there is a leak between the sleeve 9 and the inner pipe section 5. Here, since the hydraulic pressure will be greater than the fluid pressure in the inner section 5, the hydraulic fluid will migrate into the flow of fluid into the pipeline. Having said this, the action of the system will be the same as in a) since depletion of the hydraulic fluid will take place. With a small leak, there will be no shutdown but it is desirable that shutdown should take place since the hydraulic fluid is contaminating the fluid being fed along the pipeline. It is not possible to determine which of aO or b) leaks has occurred since only the state of the hydraulic fluid is being monitored. Therefore, it is desirable that, whenever a leak is detected, shutdown should be allowed to take place as soon as possible.

c) In this case, there is clearly a major failure since both the inner pipe section 5 and the outer pipe section 7 are ruptured. There is no possibility here for there to be only a minor leak and the pipeline surroundings are being contaminated by the fluid being transported. Thus a fast as possible shut down is needed. Closure of the valve 67 should take place quickly as the hydraulic control valve 14 will indicate as permanently open.

Figure 7:
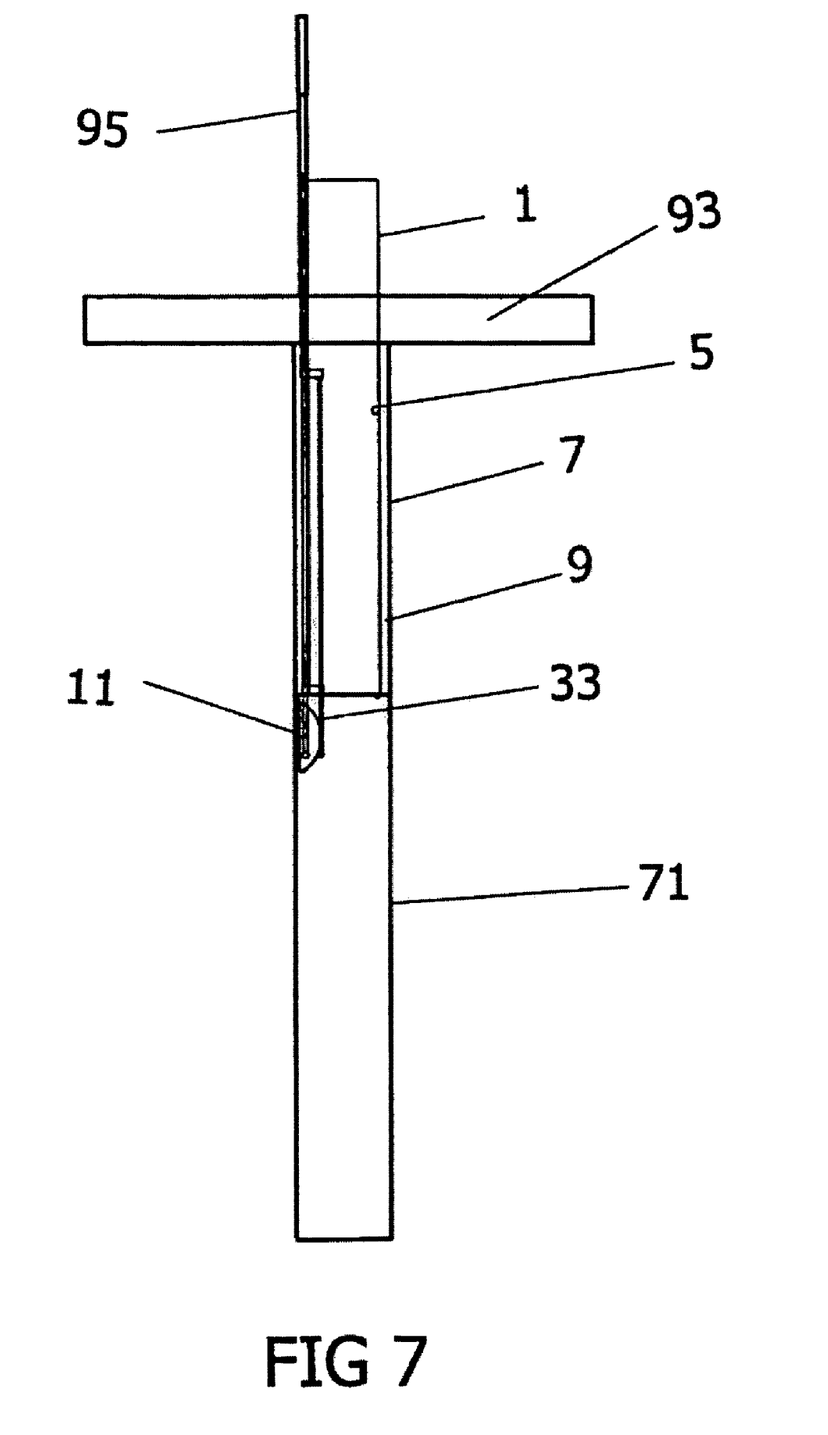
FIG. 7 is a schematic side view of the use of the inventive concept in the egress pipe of an oil well.

FIG. 7 shows how a pipeline section similar to those already described can be used to shut of the exit pipe of an oil well in the event of explosion, fire or other hazard.

In this case, only a single pipeline section 1 is installed vertically in the upper end of the well out flow channel 71 and only one flap valve 11 is provided at the lower end of the pipeline section 1. The end of the pipeline section 1 is arranged to end at ground level 93 with the remaining part of the outflow channel 71 protruding above. In addition to the hydraulic sleeve 9, a plastics lock 95, under pressure from the hydraulic fluid, maintains the integrity of the sleeve 9. In the event of a fire or an explosion, the plastics lock will melt, releasing the hydraulic pressure and allowing the flap valve 11 to close under the usual mechanism. The only difference here is that, with the position of the flap valve, the valve will not close under gravity and the start of its closing movement may need the action of a spring. Final closing of the flap valve 11 will be achieved by the pressure of gases or liquids in the out flow channel 71.

While the above has described one embodiment of the invention, it will be appreciated that many additions to or modifications of the above described embodiment may be made, without departing from the scope of the invention.

For example, the hydraulic control valve and the holding means could be combined together as a single unit with the valve member of the hydraulic control valve being mounted on the piston rod of the holding means. Other combinations are possible. While the shut off valve has been described as a flap valve, other sorts of closure valve, may be used. Transmission of the data from the pipe could be by both wireless transmission and wire transmission or either of the two methods could be omitted as desired. Communication may not only be provided between the pipeline sections and the remote control centre but also with associated adjacent pumping stations. If desired, each pipeline section could be provided with a flap valve at only one end, arrangements being made to operate the flap valve of the adjacent section with the original flap valve so as to seal the section.

The invention claimed is:

1. An automatic leak detection and isolation system for a fluid pipeline comprising a a plurality of pipeline sections through which the fluid flows, each pipeline section comprising an inner section through which the fluid flows and a sleeve coaxial with and surrounding said inner section, said sleeve shut off at each end of the pipe section and filled with a hydraulic fluid under pressure and which is different from the fluid flowing in the pipeline, a sensing device in said pipeline section for sensing a reduction of the pressure of the hydraulic fluid indicating a leakage from or within said pipeline section, and valve means to one end of each pipeline section actuable in direct response to said sensing device sensing a reduction in pressure of the hydraulic fluid, to close off one end of said pipeline section.

2. A system as claimed in claim 1, further comprising a second valve means is provided for closing off the other end of the pipeline section.

3. A system as claimed in claim 2 further comprising a sensor for each valve means.

4. A system as claimed in claim 3, wherein said pipeline further comprises a housing connecting adjacent pipeline sections and containing said valve means for the adjacent pipeline section ends.

5. A system as claimed in claim 4, wherein each valve means comprises a flap valve pivoted at its upper extremity and movable between a first or open position in which it lies substantially parallel to said pipe section and a second or closed position in which it lies substantially perpendicular to said pipe section and seats over the end of said inner section so as to close it.

6. A system as claimed in claim 5, wherein said flap is formed of three hinged sections comprising a middle section, which, in the open position, lies parallel to said pipe section and two outer sections, one on each side of said middle section, which fold inwards to a degree necessary to enable said flap, in its open position, to lie within said housing.

7. A system as claimed in claim 6, further comprising a plurality of moveable rods extending through the end of said sleeve to retain said flap in its open position and means for withdrawing of said rods into said sleeve to permit the flap to drop under gravity and to seal against the end of the inner section of the pipe section under both the action of gravity and the pressure in said pipeline.

8. A system as claimed in claim 7 wherein said rods are attached to an at least part-annular piston, forming, in combination with said rods, an hydraulic pressure sensor, which is a located in the sleeve and pushed up against the inner end of the sleeve by the force of the hydraulic pressure.

9. A system as claimed in claim 8 wherein the ends of said rods located in said housing are acted upon by the pressure in said pipeline, in the absence of hydraulic pressure in said sleeve, to force said rods to withdraw into said sleeve, and, at the same time moving said piston away from the inner end wall of said sleeve.

10. A system as claimed in claim 8 wherein said flap valve has contacts to indicate whether said flap valve is opened or closed.

11. A system as claimed in claim appendent directly or indirectly to claim 8, wherein holding means are provided to hold the at least part-annular piston against the end of the sleeve when the hydraulic pressure is present in the sleeve.

12. A system as claimed in claim 11, wherein said holding means comprises a holding member, a holding piston and cylinder, to the piston of which said holding member is connected, said piston being acted on by the hydraulic pressure in said sleeve in a direction to push said holding member against the at least part-annular piston to hold it in position at the end of said sleeve.

13. A system as claimed in claim 12, and further comprising a ball valve for detecting the fullness of said sleeve with hydraulic fluid, the ball mechanism of said ball valve comprising a projection engageable with teeth on said piston rod of said piston of said holding piston and cylinder when said sleeve is full of hydraulic fluid to prevent movement of said piston in a direction to disengage said holding member from the said at least part-annular piston.

14. A system as claimed in claim 8, further comprising an hydraulic control valve which controls admission of hydraulic fluid to said sleeve and acts as a sensor for the hydraulic fluid in said sleeve to provide indications as to the state of the hydraulic pressure.

15. A system as claimed in claim 14, wherein said hydraulic control valve has two pairs of contacts, one of which closes when said valve is closed and the other of which closes when said valve is open.

16. A system as claimed in claim 15, further comprising transmitting means for transmitting data about said pipe section to a central control station from various contacts associated with the operating parts of the pipeline section.

17. A system as claimed in claim 14, wherein said hydraulic control valve has a valve seat connected to an hydraulic fluid line, a conical valve member and a spring urging said conical valve member against said valve seat, the rear of said valve member being open to the hydraulic pressure in said sleeve.

18. A system as claimed in claim 17, wherein said spring is dimensioned, when the hydraulic pressure at the valve seat is substantially the same as the hydraulic pressure in said sleeve, to push said valve member against said seat to close said valve and, when the hydraulic pressure in said sleeve is reduced, to allow the pressure of the hydraulic fluid at said valve seat to push said valve member away from said valve seat to open said valve against the pressure of said spring.

19. A system as claimed in claim 17, and comprising an electrically operated valve to control the feed to said valve seat.

20. A system as claimed in claim 19, wherein the sleeve is provided with an air bleed valve.

* * * * *